United States Patent
Raymond

(10) Patent No.: US 11,701,734 B2
(45) Date of Patent: Jul. 18, 2023

(54) APPARATUS AND METHODS ASSOCIATED WITH OPERATING A PLASMA TORCH

(71) Applicant: The ESAB Group Inc., Florence, SC (US)

(72) Inventor: Andrew Raymond, Lebanon, NH (US)

(73) Assignee: THE ESAB GROUP, INC., North Bethesda, MD (US)

(*) Notice: Subject to any disclaimer, the term of this patent is extended or adjusted under 35 U.S.C. 154(b) by 138 days.

(21) Appl. No.: 16/521,626

(22) Filed: Jul. 25, 2019

(65) Prior Publication Data
US 2021/0023644 A1    Jan. 28, 2021

(51) Int. Cl.
| | |
|---|---|
| *B23K 10/00* | (2006.01) |
| *F16K 1/52* | (2006.01) |
| *H05H 1/36* | (2006.01) |
| *H05H 1/34* | (2006.01) |

(52) U.S. Cl.
CPC ............ *B23K 10/006* (2013.01); *F16K 1/52* (2013.01); *H05H 1/34* (2013.01); *H05H 1/36* (2013.01)

(58) Field of Classification Search
CPC ........ B23K 10/006; B23K 10/00; H05H 1/34; H05H 1/36; H05H 1/26
USPC ............ 219/121.39, 121.45, 121.54, 121.55, 219/121.48, 121.51, 121.5
See application file for complete search history.

(56) References Cited

U.S. PATENT DOCUMENTS

| | | | |
|---|---|---|---|
| 4,906,900 A * | 3/1990 | Asmussen | H05H 1/46 315/111.81 |
| 5,278,388 A * | 1/1994 | Huang | H05H 1/3405 219/121.48 |
| 5,414,237 A | 5/1995 | Carkhuff | |
| 5,415,237 A * | 5/1995 | Strattan | E21B 33/0355 166/324 |
| 5,760,363 A | 6/1998 | Hackett et al. | |
| 5,796,067 A * | 8/1998 | Enyedy | H05H 1/34 219/121.52 |
| 6,084,199 A | 4/2000 | Lindsay et al. | |
| 6,093,905 A | 7/2000 | Hardwick et al. | |
| 6,163,009 A | 12/2000 | Hardwick et al. | |

(Continued)

FOREIGN PATENT DOCUMENTS

| | | |
|---|---|---|
| DE | 69308448 T2 | 10/1997 |
| FR | 2663252 A1 | 12/1991 |

(Continued)

OTHER PUBLICATIONS

Notification of Transmittal of International Search Report and Written Opinion including International Search Report and Written Opinion for PCT/US2020/042969 dated Oct. 22, 2020, 14 pages.

*Primary Examiner* — Helena Kosanovic
*Assistant Examiner* — Ahmad Abdel-Rahman
(74) *Attorney, Agent, or Firm* — Edell, Shapiro & Finnan, LLC

(57) ABSTRACT

Apparatus and methods associated with operating a plasma torch are disclosed. According to some implementations, the apparatus and methods involve the delivery of a process gas to a shuttle valve at first and second pressures for the purpose of altering an axial position of a valve element located inside the shuttle valve. The shuttle valve is configured such that at different axial positions of the valve element the flow of process gas into the plasma torch is altered.

13 Claims, 12 Drawing Sheets

(56) References Cited

U.S. PATENT DOCUMENTS

| | | |
|---|---|---|
| 6,326,583 B1 | 12/2001 | Hardwick et al. |
| 6,477,623 B2 | 11/2002 | Jeddeloh |
| 6,498,317 B2 | 12/2002 | Hardwick |
| 6,677,551 B2 | 1/2004 | Hardwick |
| 6,772,040 B1 | 8/2004 | Picard et al. |
| 8,278,588 B2 | 10/2012 | Salsich et al. |
| 8,283,594 B2 | 10/2012 | Griffin |
| 8,378,249 B2 | 2/2013 | Salsich et al. |
| 8,710,396 B2 | 4/2014 | Salsich et al. |
| 8,729,423 B2 | 5/2014 | Griffin |
| 8,754,348 B2 | 6/2014 | Salsich et al. |
| 9,427,820 B2 | 8/2016 | Mather et al. |
| 9,510,435 B2 | 11/2016 | Hebert et al. |
| 9,642,237 B2 | 5/2017 | Peters et al. |
| 9,743,505 B2 | 8/2017 | Laurisch et al. |
| 10,137,522 B2 | 11/2018 | Winn |
| 2002/0117483 A1 | 8/2002 | Jones et al. |
| 2004/0149702 A1* | 8/2004 | Dallavalle ............... H05H 1/34 219/121.51 |
| 2005/0035093 A1* | 2/2005 | Yamaguchi ............ B23K 10/00 219/121.39 |
| 2007/0045241 A1* | 3/2007 | Schneider ................ H05H 1/34 219/121.36 |
| 2010/0155377 A1* | 6/2010 | Lindsay ................ B23K 31/10 219/121.44 |
| 2015/0021302 A1* | 1/2015 | Zhang ..................... H05H 1/34 219/121.52 |
| 2015/0225833 A1* | 8/2015 | Kowalsky ................ H05H 1/42 427/446 |
| 2017/0095877 A1 | 4/2017 | Ames et al. |
| 2017/0095878 A1 | 4/2017 | Liebold et al. |
| 2017/0095879 A1 | 4/2017 | Mitra et al. |
| 2017/0203381 A1 | 7/2017 | Jogdand et al. |

FOREIGN PATENT DOCUMENTS

| | | |
|---|---|---|
| JP | 2005288446 A | 10/2005 |
| WO | 9907193 | 2/1999 |

* cited by examiner

APPARATUS AND METHODS ASSOCIATED WITH OPERATING A PLASMA TORCH

TECHNICAL FIELD

The present disclosure relates to single gas plasma cutting systems.

BACKGROUND

The ability to change the flow rate and flow path of a process gas in single process gas plasma torch assemblies during startup and shutdown is needed.

SUMMARY

The present disclosure is directed towards delivering a single process gas through different flow paths at different flow rates to one or more process gas flow chambers of a plasma torch during different modes of operation of the plasma torch.

According to one implementation a plasma torch is provided that includes an electrode, tip, shield cup and shuttle valve. The shuttle valve includes a first process gas flow chamber into which a process gas is delivered. Located between an exterior surface of the electrode and an interior surface of the tip is a second process gas flow chamber (i.e. arc chamber) that is selectively placed in fluid communication with the first process gas flow chamber via an opening that separates the two. Located between an exterior surface of the tip and an interior surface of the shield cup is a third process gas flow chamber (i.e. shield gas chamber) that is fluid communicable with the first process gas flow chamber via one or more through holes of a first size and one or more through holes of a second size large than the first size. According to one implementation, the third process gas flow chamber at least partially surrounds each of the first and second process gas flow chambers. Each of the second and third process gas flow chambers includes a distal outlet through which the process gas exits the plasma torch. A proximal end portion of the electrode is located in the first process gas flow chamber and a distal end portion of the electrode is located in the second process flow channel.

The shuttle valve includes a valve element that is transitional between first and second axial positions. When the valve element is in the first axial position, the first process gas flow chamber is in fluid communication with second process gas flow chamber through the opening that separates them and is also in fluid communication with the third process gas flow chamber via the one or more holes of the first size and not the one or more holes of the second size. When the valve element is in the second axial position, process gas flow from the first process gas flow chamber to the second process gas flow chamber is prevented by a closing of the opening between them by the valve element and process gas flow from the first process gas flow chamber to the third process gas flow chamber is permitted through the one or more holes of the second size. According to some implementations the valve element is continuously urged toward the first axial position by a spring and is transitional between the first and second axial positions depending on the process gas pressure delivered into the shuttle valve. By virtue of the use of the shuttle valve and the arrangement of the first, second and third process gas flow chambers, plasma process gas is delivered to the arc chamber in an on/off fashion and process shield gas is selectively delivered to the shield gas chamber at different flow rates.

According to other implementations a plasma torch assembly is provided that includes a plasma torch having an electrode and a tip. Located between the exterior surface of the electrode and the interior surface of the tip is a first process gas flow chamber (i.e. arc chamber). The assembly also includes a shuttle valve that includes a second process gas flow chamber located in a process gas flow path upstream the arc chamber. The second process gas flow chamber has an inlet, a first outlet and a second outlet located upstream the first outlet. A valve element located inside the second process gas flow chamber is transitional between a first axial position and a second axial position. When the valve element is in the first axial position, the second process gas flow chamber is in fluid communication with the arc chamber through the first outlet. When the valve element is in the second axial position, the second process gas flow chamber is in fluid communication with the arc chamber through the second outlet. According to some implementations the valve element is continuously urged toward the first axial position by a spring and is transitional between the first and second axial positions depending on the process gas pressure delivered into the shuttle valve. By use of the shuttle valve, plasma process gas may be selectively delivered to the arc chamber at different flow rates and/or different pressures.

Methods for operating a plasma torch are also provided. According to one implementation the method includes delivering a process gas at a first pressure to a process gas flow chamber of a shuttle valve and subsequently delivering the process gas to an arc chamber and shield gas chamber of the plasma torch. The process gas flow chamber includes first, second and third process gas outlets. Process gas is deliverable to the arc chamber through the first outlet and to the shield gas chamber through the second and third outlets. The second and third outlets are respectively configured to deliver the process gas to the shield gas chamber at first and second flow rates with the second flow rate being greater than the first flow rate. When the process gas at the first pressure is delivered to the process gas flow chamber of the shuttle valve, process gas is delivered to the arc chamber through the first outlet and to the shield gas chamber through the second outlet. The method further includes delivering the process gas at a second pressure to the process gas flow chamber of the shuttle valve to cause a closing of the first outlet to terminate process gas flow to the arc chamber and to divert the process gas to the shield gas chamber flow through the third outlet.

Other methods for operating a plasma torch assembly that includes a plasma torch and a shuttle valve are also provided. According to one implementation the plasma torch includes an arc chamber located between an exterior surface of an electrode and an interior surface of a tip. The shuttle valve includes a process gas flow chamber fluid communicable with the arc chamber via first and second outlets. According to one implementation the method includes delivering a process gas at a first pressure to the process gas flow chamber of the shuttle valve to cause a delivery of the process gas to the arc chamber through the first outlet of the shuttle valve at a first flow rate. The method further includes delivering the process gas at a second pressure to the process gas flow chamber of the shuttle valve to cause a closing of the first outlet and a delivery of the process gas to the arc chamber through the second outlet of the shuttle valve at a second flow rate greater than the first flow rate.

These and other advantages and features will become evident in view of the drawings and detailed description.

DETAILED DESCRIPTION

Figure 1:
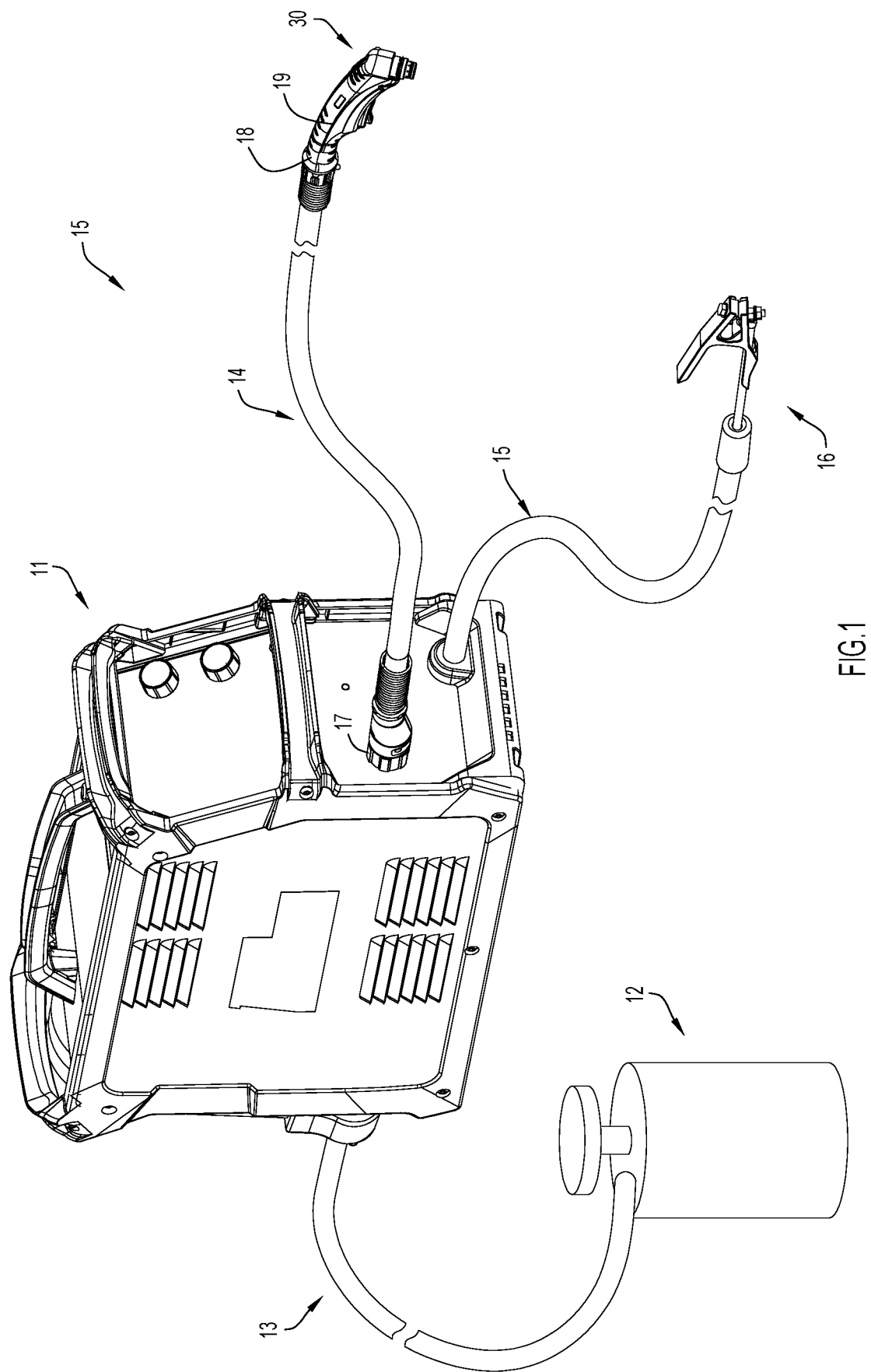
FIG. 1 is a perspective view of a plasma torch cutting system according to one implementation.

Various implementations of operating a plasma torch are disclosed herein. FIG. 1 illustrates an example cutting system 10 in which the techniques presented herein may be carried out. The depicted cutting system 10 includes a power supply 11 that supplies power to a torch assembly 20. The power supply 11 also controls the flow of a process gas (e.g. oxygen, nitrogen, argon) from a process gas supply 12 to the torch assembly 20 (however, in other implementations, the power supply 11 might supply the process gas itself). The process gas supply 12 is connected to the power supply via cable hose 13 and the power supply 11 is connected to the plasma torch 30 via cable hose 14. The cutting system 10 also includes a working lead 15 with a grounding clamp 16 disposed at an end thereof.

Cable hose 13, cable hose 14, and/or working lead 15 may each include various conductors so that they may transmit data, electricity, signals, etc. between components of the cutting system 10 (e.g., between the power supply 11 and the torch 30) and, as is illustrated, cable hose 13, cable hose 14, and/or working lead 15 may each be any length. In order to connect the aforementioned components of the cutting system 10, the opposing ends of cable hose 13, cable hose 14, and/or working lead 15 may each be coupled to the gas supply 12, power supply 11, torch 30, or clamp 16 in any manner now known or developed hereafter (e.g., a releasable connection). The cable hose 14 may include a first connector 17 that releasably couples a first end of the cable hose 14 to a port of the power supply 11 and may also include a second connector 18 that releasably couples a second end of the cable hose 14 to the torch 30. Thus, the torch 30 may be releasably coupled to the power supply 11 via a releasable connection formed between the cable hose 14 and the power supply 11 and/or via a releasable connection formed between the cable hose 14 and the torch 30.

Figure 2A:
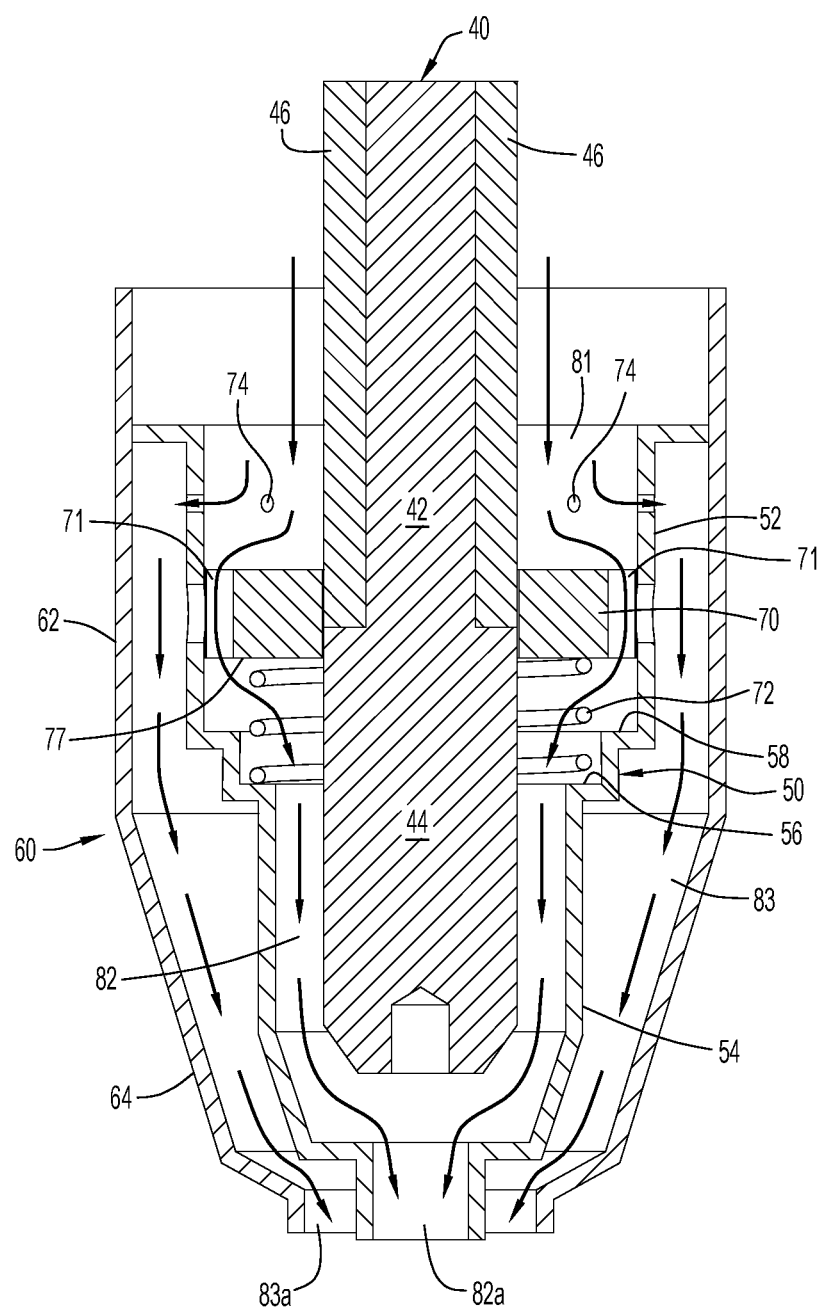
FIG. 2A is a cross-section side view of an end section of a plasma torch according to one implementation, the plasma torch including a shuttle valve with a valve element in a first axial position.
Figure 2B:
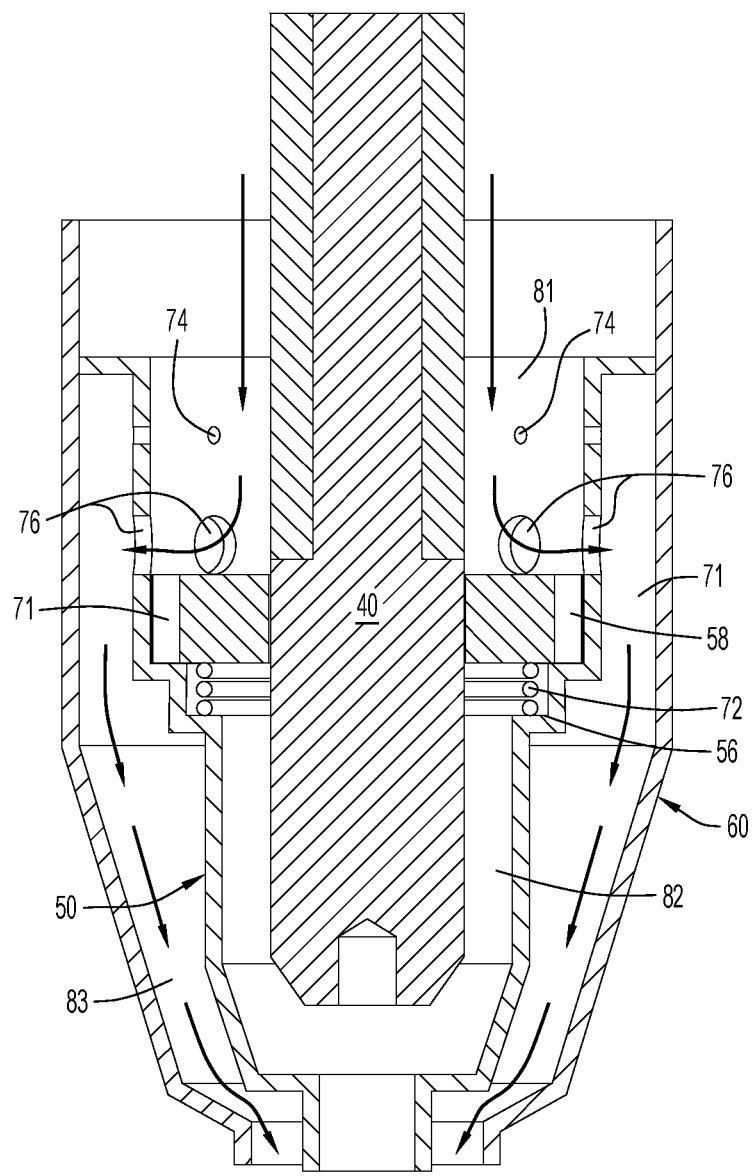
FIG. 2B is a cross-section side view of the end section of the plasma torch of FIG. 2A with the valve element of the shuttle valve being in a second axial position.
Figure 2C:
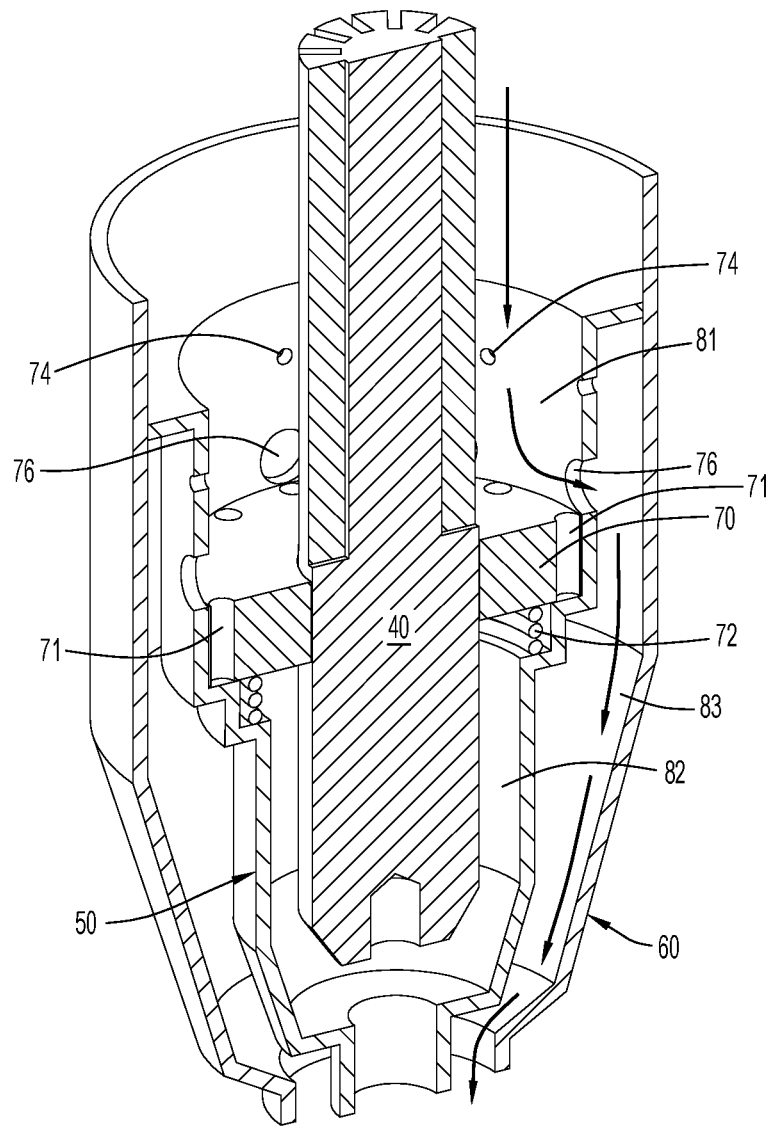
FIG. 2C is a cross-sectional perspective view of the end section of the plasma torch shown in FIG. 2B.

FIGS. 2A-C illustrate a distal end portion of the plasma torch 30 according to one implementation. For simplicity, FIGS. 2A-C illustrate a distal end portion of the plasma torch without various components or parts, such as power components, that are typically included in a plasma cutting torch. Instead, FIGS. 2A-C only illustrate select components or parts that allow for a clear and concise illustration of the techniques presented herein. In the depicted implementation, the plasma torch 30 includes an electrode 40, a torch tip 50, a shield cup 60 and a shuttle valve. The shuttle valve includes a valve element 70 that resides in and moves axially inside a first process gas flow chamber 81. Located between an exterior surface of the electrode 40 and an interior surface of the tip 50 is a second process gas flow chamber 82 (i.e. arc chamber), and located between an exterior surface of the tip 50 and an interior surface of the shield cup 60 is a third process gas flow chamber 83 (i.e. shield gas chamber) that at least partially surrounds each of the first and second process gas flow chambers 81 and 82. Process gas delivered into the second and third process gas flow chambers respectively exits the torch 30 at a distal end thereof through outlet openings 82a and 83a.

In use, the plasma torch 30 is configured to emit a plasma arc between the electrode 40 and a workpiece to which the grounding clamp 16 is attached. As noted above, and as shown in FIGS. 2A-C, the torch tip 50 is spaced a distance away from the electrode with the second process gas flow chamber 82 disposed between them. During initiation, power is first supplied to the torch tip 50 to generate an arc between the torch tip 50 and the electrode 40 across the second process gas flow chamber 82. As process gas flows through chamber 82 during arc initiation it is ionized to form an electrically conductive plasma that is then directed out the distal end of the tip 50 toward an electrically conductive workpiece (e.g. metal workpiece). Once this occurs, power (typically DC power) is supplied to the electrode 40 and an electrical circuit is established between the power source and a ground to which the workpiece is coupled via the grounding clamp 16. A plasma arc that closes the electrical circuit is thus established between the electrode 40 and the workpiece, the plasma arc being sufficient to cut through the workpiece by a localized melting of the material from which the workpiece is made. When power is supplied to the electrode 40, power to the torch tip 50 is terminated.

The valve element 70 of the shuttle valve is moveable between a first axial position as shown in FIG. 2A and a second axial position distal to the first axial position as shown in FIGS. 2B and 2C. According to some implementations the tip 50 comprises a proximal end portion 52 and a distal end portion 54 with the first process gas flow chamber 81 of the shuttle valve being formed by a wall portion of the proximal end portion 52 of the tip 50 and the second process gas flow chamber 82 being formed in part by a wall portion of the distal end portion 54 of the tip 50. The first process gas flow chamber 81 is fluid communicable with the second process gas flow chamber 82 via an opening 53 that separates them. The wall portion of the proximal end portion 52 of the tip 50 includes one or more holes of a first size 74 and one or more holes of a second size 76 that communicate the first process gas flow chamber 81 with the third process gas flow chamber 83. In the implementation of FIGS. 2A-D the shuttle valve includes a first plurality of holes of the first size 74 and a second plurality of holes of the second size 74 with the first plurality of holes being located distal to the first plurality of holes. The term "size", as used in the terms "first size" and "second size" herein, denotes a cross-sectional area of the holes through which the process gas passes into the third process gas flow chamber.

When the valve element 70 of the shuttle valve is in the first axial position as shown in FIG. 2A, a first portion of the process gas delivered into the first process gas flow chamber 81 is passed on to the second process gas flow chamber through the opening 53 that separates the two chambers. A second portion of the process gas is simultaneously passed on to the third process gas flow chamber 83 through the one or more holes of the first size 74 to deliver shield gas to the distal-most end of the plasma torch 30 at a first flow rate. When in the first axial position, the peripheral sidewall portions 73 of the valve element 70 cover the second plurality of holes 76 to prevent the passage of process gas through them.

When the valve element 70 of the shuttle valve is in the second axial position, the valve element blocks the opening 53 joining the first and second process gas flow chambers 81 and 82 to prevent the passage of process gas into the second process gas flow chamber 82 and at the same time is positioned distal to the second plurality of holes 76 to enable the process gas delivered into the first process gas flow chamber 81 to pass into the third process gas flow chamber 83 through the second plurality of holes 76 at a second flow rate that is greater than the first flow rate.

Figure 3A:
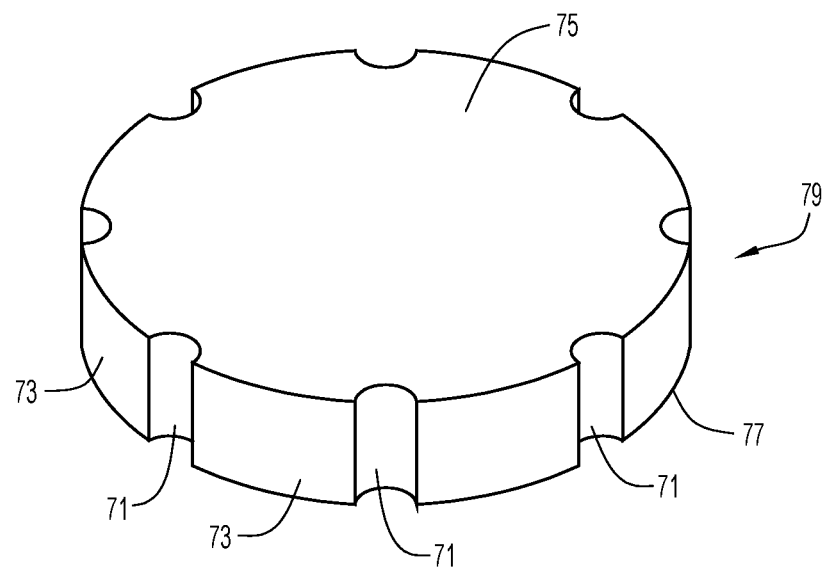
FIG. 3A is a top perspective view of a valve element of a shuttle valve according to one implementation.
Figure 3B:
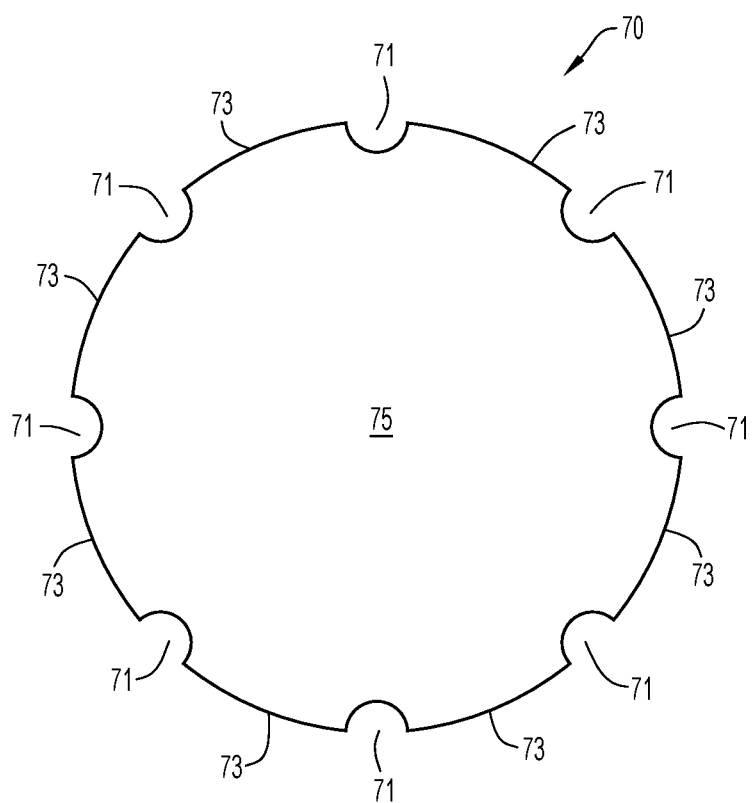
FIG. 3B is a top view of the valve element of FIG. 3A.

FIGS. 3A and 3B respectively show perspective and top views of the valve element 70 according to one implementation. The valve element 70 includes a proximal facing surface 75, a distal facing surface 77 and a peripheral sidewall 79 that extends axially between the proximal and distal facing surfaces 75 and 77. When the valve element 70 is located inside the first process flow chamber 81 of the shuttle valve, the proximal facing surfaces faces toward an inlet to the shuttle valve and the distal facing surfaces faces toward the opening 53 disposed between the first and second process gas flow chambers 81 and 82. Located in the peripheral sidewall 79 of the valve element 70 are a plurality of recesses 71 through which the process gas flows into the second process gas flow chamber 82 when the valve element is in the first axial position. Interposed between the recesses 71 are peripheral sidewall portions 73 that are arranged to block the second plurality of openings 76 when the valve element 70 is in the first axial position. As noted above, when the valve element 70 transitions from the first axial position to the second axial position, the peripheral sidewall portions 73 move distally away from the second plurality of holes 76 to allow process gas to flow through them. According to some implementations the valve element 70 is continuously urged toward the first axial position by a spring 72.

Looking again to the construction of the tip 50, internal to the tip is a first shoulders 56 on which the distal end of the spring 72 rests or is attached. The proximal end of the spring 72 rests or is attached to the distal facing surface 77 of the valve element 70. When the valve element 70 is in the second axial position, the distal facing surface 77 of the valve element 70 abuts the second shoulder 58 to close the passage of process gas through the recesses 71 to prevent a flow of process gas into the second process gas flow chamber 82. As will be discussed in more detail below, movement of the valve element 70 between the first and second axial positions is achieved by varying the pressure of the process gas entering the first process gas flow chamber 81.

In the foregoing description, the first and second process gas flow chambers 81 and 82 are each formed in part respectively by proximal and distal wall segments 52 and 54 of the torch tip 50. According to other implementations, the first gas flow chamber 81 is not formed by a part of the tip 50, but is instead formed by separate structure that may or may not be attached to the torch tip.

Figure 2D:
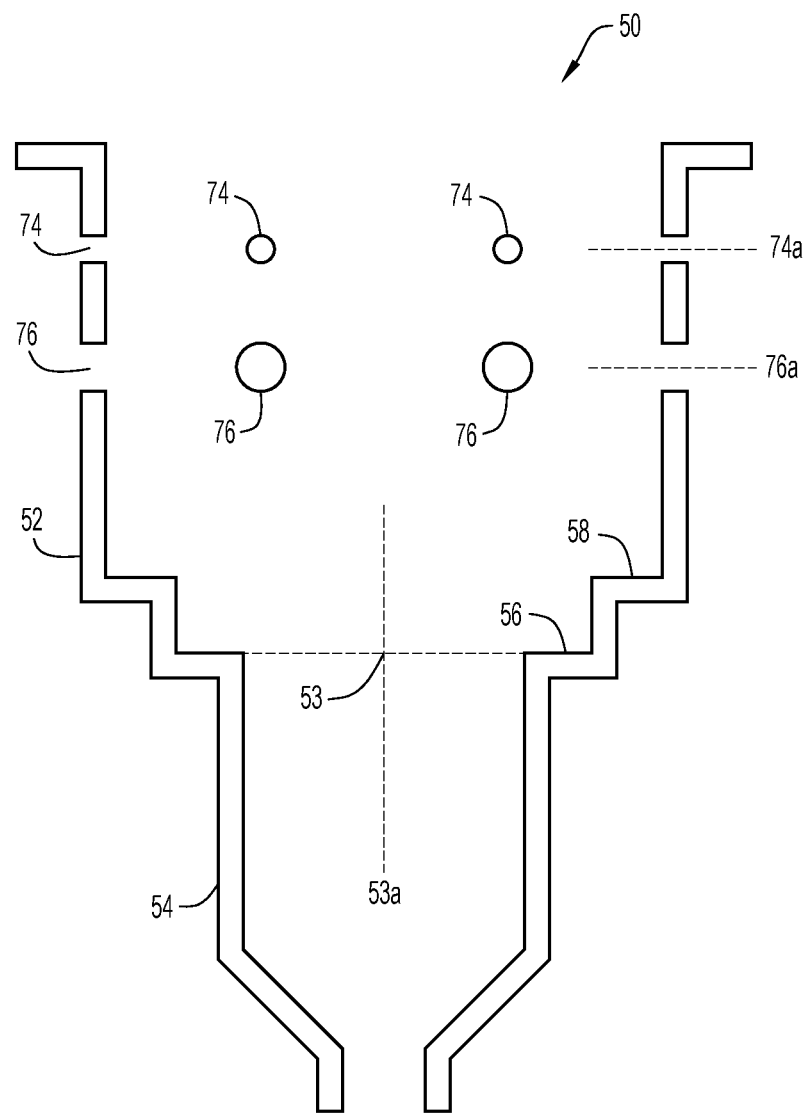
FIG. 2D is a cross-sectional side view of a plasma torch tip according to one implementation.

As shown in FIG. 2D, according to one implementation the holes of the first size 74, holes of the second size 76 and opening 53 respectively have a central axis 74a, 76a and 53a, with the each of the central axes 74a and 76a being non-parallel to the central axis 53. According to some implementations, one or both of central axes 74a and 76a are orthogonal to the central axis 53 as shown in FIG. 2D.

As shown in FIGS. 2A-C, according to some implementations the proximal end portion of the electrode 40 is located in the process gas flow path and may include one or more indentations in its exterior surface to provide a larger surface area across which the process gas may flow to effectuate a cooling of the electrode 40. In FIGS. 2A-C the one or more indentations form in the exterior surface of the electrode multiple spaced-apart radially protruding fins.

As noted above, movement of the valve element 70 between the first and second axial positions is achieved by varying the pressure of the process gas entering the first process gas flow chamber 81. According to one method of operating the plasma torch 30, a process gas is delivered to the first process gas flow chamber 81 at a first pressure that is insufficient to move the valve element 70 away from its first axial position. As such, a first portion of the process gas flows distally out of the first process gas flow chamber 81 through recesses 71 and opening 53 into the second process flow 82. At the same time, a second portion of the process gas flows out of the first process gas flow chamber radially outward through the first plurality of holes 74 into the third process gas flow chamber 83. According to some implementations this configuration corresponds to a first operating mode of the plasma torch 30 wherein process gas is passed into the arc chamber 82 through the opening 53 for the purpose of producing a plasma arc across the electrode 40 and the workpiece, and at the same time process gas is passed into the third process gas flow chamber at a first flow rate for the purpose of providing a shield gas at the distal end of the tip 50.

At a point in time when the plasma torch is in shut down mode, the process gas is delivered to the first process gas flow chamber 81 at a second pressure greater than the first pressure that is sufficient to move the valve element 70 of the shuttle valve distally from the first axial position to the second axial position. This results in the distal facing surface 77 of the valve element 70 being forced against a valve seat/shoulder 58 located at a junction between the first process gas flow chamber 81 and arc chamber 82 to close off the flow of process gas through the recesses 71 of the valve element 70 to prevent the passage of process gas to the arc chamber 82. Decaying process gas existing in the arc chamber 82 is subsequently expelled out of the arc chamber 82 through its distal outlet 82a. Concurrently with shutting off process gas flow to the arc chamber 82, the peripheral side portions 73 of the valve element 70 move distally away from the second plurality of holes 76 so that the process gas is delivered into the shield gas chamber 83 at a second flow rate greater than the first flow rate. Increasing the process gas flow rate flowing through the first and third process gas flow chambers 81 and 83 at shutdown advantageously expedites the cooling of the electrode 40.

Figure 4:
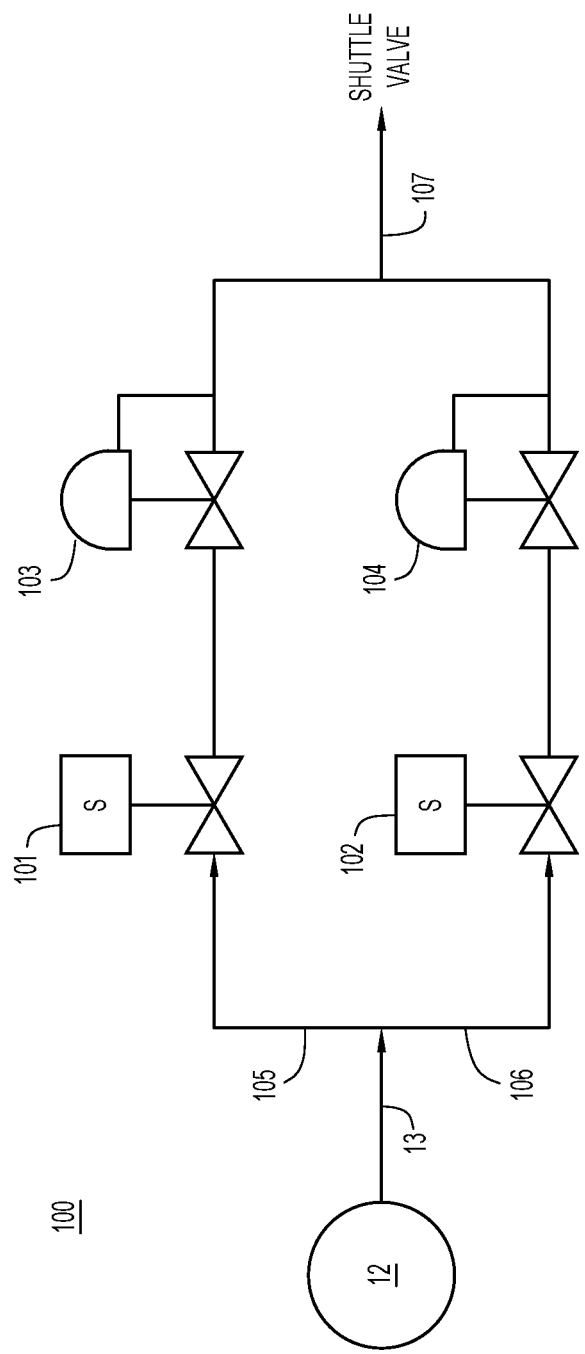
FIG. 4 is a schematic diagram of a pressure regulating system that is configured to deliver process gas at different pressures to a shuttle valve.

The delivery of process gas at different pressures to the shuttle valve may be accomplished in a variety of ways. For example, a proportional valve may be located anywhere between the process gas source 12 and the inlet to the shuttle valve to ramp up and ramp down the pressure delivered to the shuttle valve. Alternatively, as shown in FIG. 4, a pressure regulating system 100 including first and second pressure regulators 103 and 104 may be used to deliver process gas to the shuttle valve at different pressures. The example pressure regulating system 100 of FIG. 4 includes first and second solenoid operated on/off valves 101 and 102 and first and second pressure regulating valves 103 and 104 that are respectively located in series with and downstream on/off valves 101 and 102. Valves 101 and 103 are located in a first branch 105 and valves 102 and 104 are located in a second branch 106 arranged parallel to the first branch 105. In the example of FIG. 4, the pressure source 12 is fluidly coupled to the first and second branches 105 and 106 through cable hose 13. An outlet 107 of the pressure regulating system 100 is fluidly coupled to the shuttle valve. The first and second pressure regulators 103 and 104 are respectively configured to regulate the pressure at the outlet 107 at the first and second pressures. As explained above, the second pressure is greater than the first pressure. According to one implementation, the first pressure is less than 100 psig and the second pressure is greater than 100 psig. The first pressure may be, for example, 80±15 psig and the second pressure may be, for example, 120±15 psig.

According to some implementations, valves 101-104 are located inside the power supply 11, while in other implementations the valves 101-104 are located external to the power supply nearer the process gas source 12. As noted above, in some circumstances the process gas source resides inside the power supply 11. In such implementations, a connection of the process gas source to the pressure regulating system 100 occurs inside the power supply 11.

According to one method, when the plasma torch is in the first operating mode the first on/off valve 101 is open and the second on/off valve is closed so that the process gas is supplied to the shuttle valve at the first pressure to maintain the valve element 70 of the shuttle valve in its first axial position. When the plasma torch is in the shutdown mode the first on/off valve 101 is closed and the second on/off valve is open so that the process gas is supplied to the shuttle valve at the second pressure to cause the valve element 70 of the shuttle valve to transition from the first axial position to the second axial position.

Figure 5:
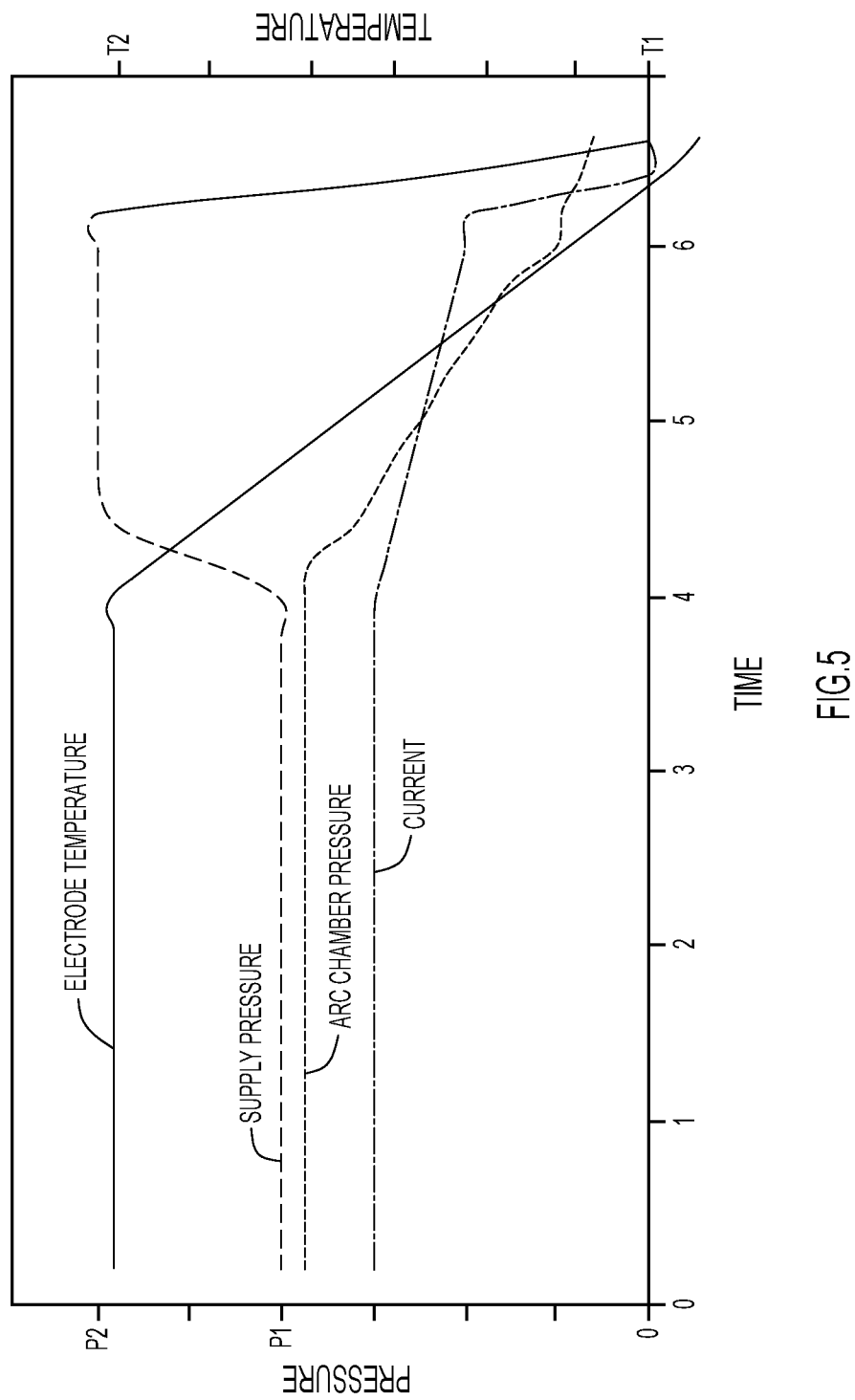
FIG. 5 is a graph showing the operational characteristics of a plasma torch during plasma torch operation and plasma torch shutdown.

FIG. 5 is a graphical representation of the operating characteristics of the plasma torch 30 when the plasma torch is in the first operating mode and in the shutdown mode. In the time interval 0-4 the plasma torch is in the first operating mode with the process gas being supplied to the shuttle valve at the first pressure P1 and current is being delivered to the electrode 40 at a first ampere. At time interval 4, the process of shutting down the plasma torch begins with a ramping down of the current at a first rate until the current is discontinued at time interval 6. At, or around the time the current begins its ramp down, the pressure delivered to the shuttle valve is ramped up to the second pressure P2 to cause the valve element 70 of the shuttle valve to shut-off process gas flow to the arc chamber 82. Once this occurs, the process gas existing inside the arc chamber 82 is vented out of the arc chamber through outlet 82a. At the same time an increased process gas flow is delivered across at least the proximal end portion 42 of the electrode 40 as a result of the valve element transitioning to its second axial position. As shown in FIG. 5, the temperature of the electrode 40 at time interval 4 is T2 and is lowered to a temperature T1 as it is cooled by the process gas. At time interval 6, or thereafter, current to the electrode 40 and the flow of process gas to the shuttle valve are terminated to place the plasma torch 30 in a shutdown state.

As discussed above, according to one implementation the first pressure P1 is below 100 psig (e.g. 80±15 psig) and the second pressure P2 is greater than 100 psig (e.g. 120±15 psig).

According to other implementations a plasma torch assembly is provided that includes a shuttle valve 200 located in a lead line to a plasma torch. The lead line may be in the torch handle 19, inside the power supply 11, inside the cable hose 17, etc.

Figure 6A:
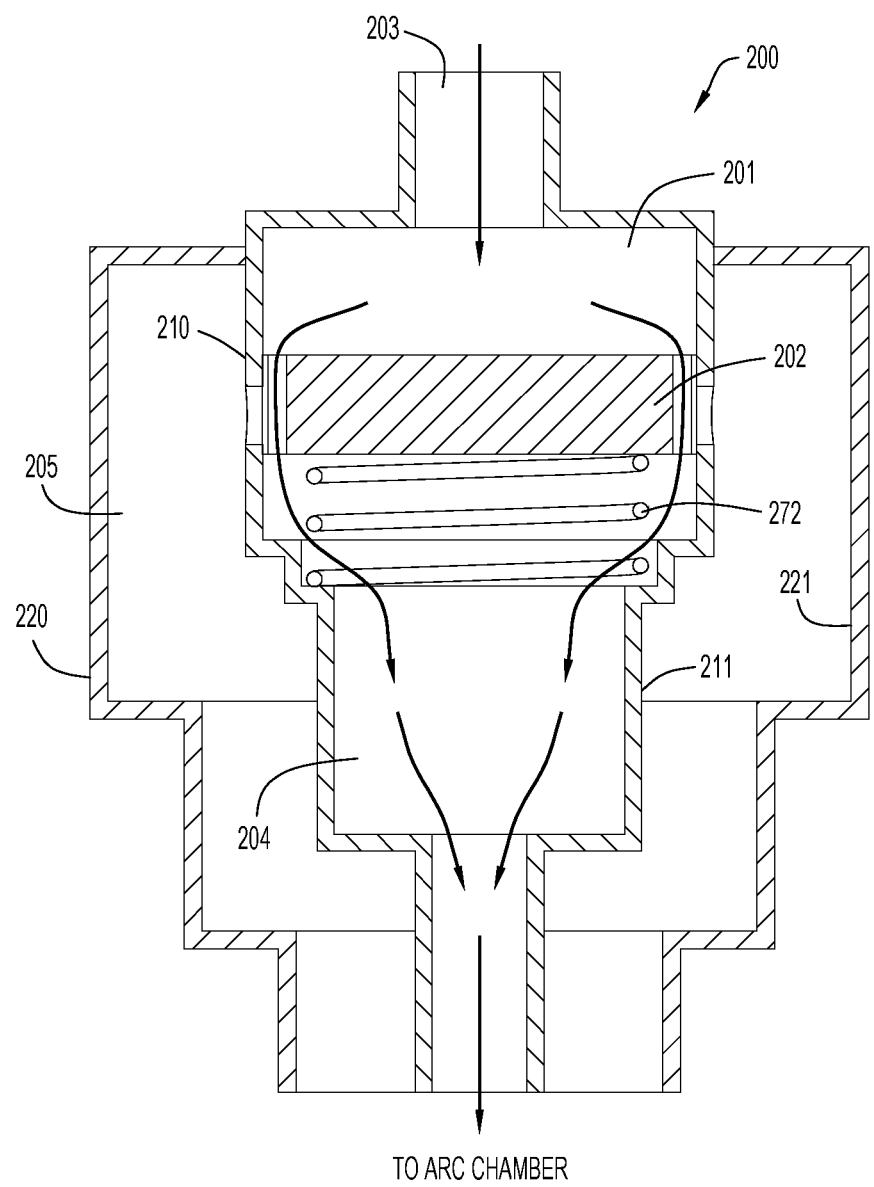
FIG. 6A is a cross-section side view of shuttle valve located in a process gas lead line to a plasma torch according to one implementation with the valve element of the shuttle valve in a first axial position.
Figure 6B:
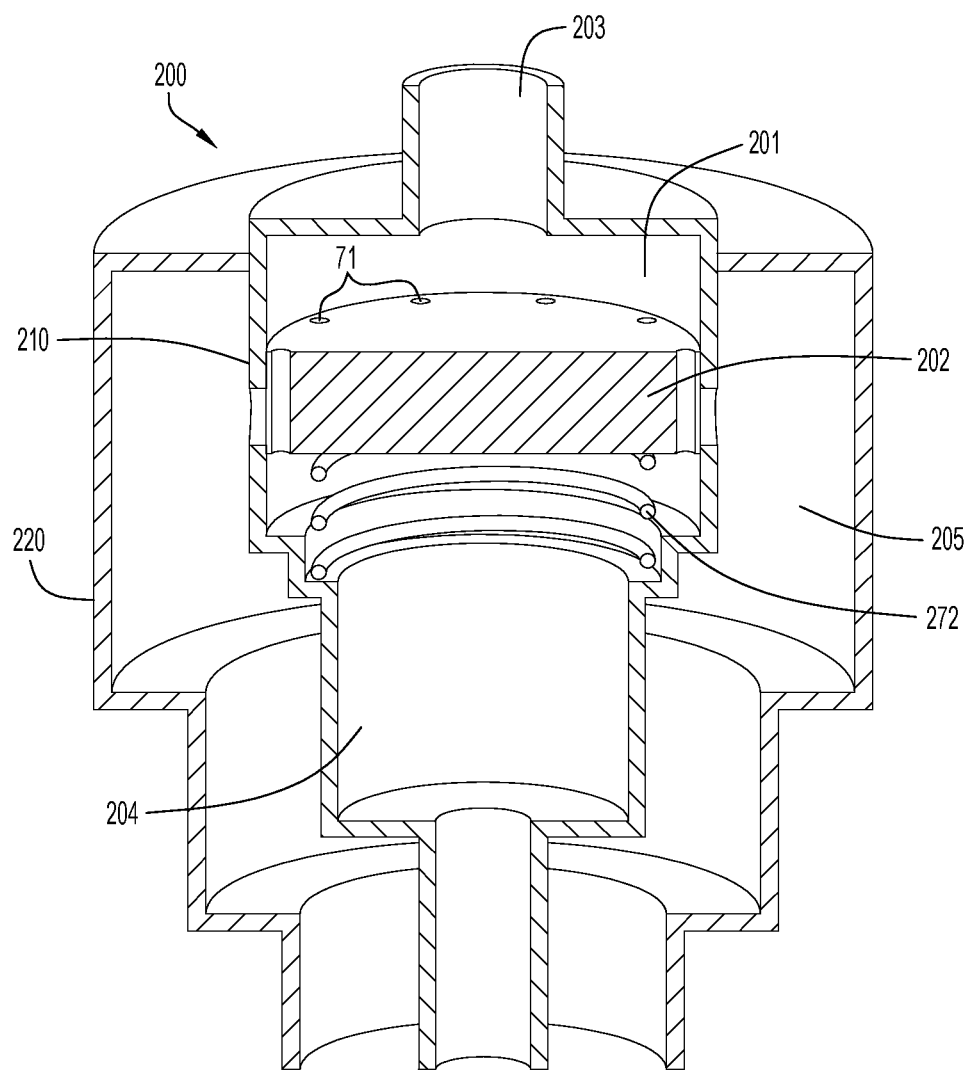
FIG. 6B is a cross-sectional perspective view of the shuttle valve shown in FIG. 6A.
Figure 6C:
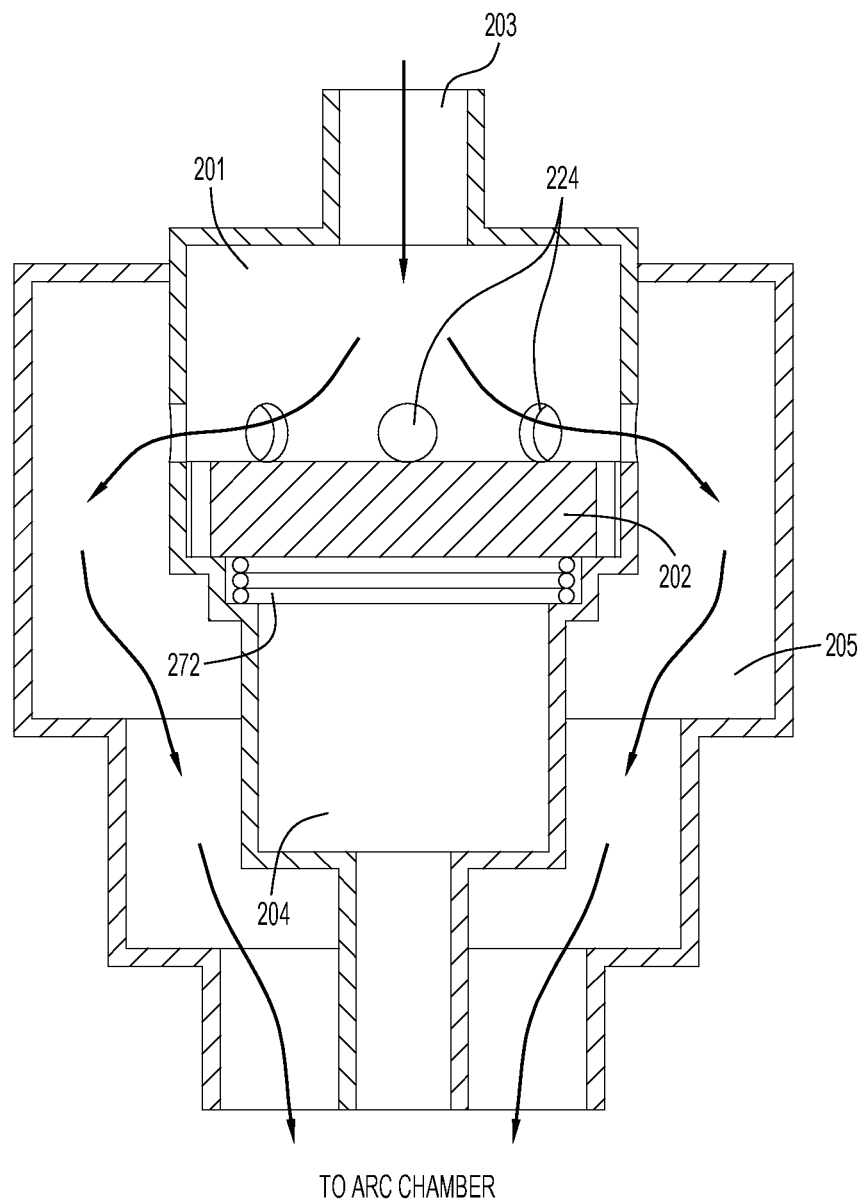
FIG. 6C is a cross-section side view of the shuttle valve of FIG. 6A with the valve element of the shuttle valve being in a second axial position.

According to some implementations, as shown in FIGS. 6A-C, the shuttle valve 200 includes a process gas flow chamber 201 in which resides a valve element 202 that is moveable inside the process gas flow chamber between a first axial position (see FIGS. 6A-B) and a second axial position (see FIG. 6C). The shuttle valve includes an inlet 203 through which process gas is delivered into the process gas flow chamber 201. The shuttle valve 200 also includes a first outlet conduit 204 and a second outlet conduit 205 that are respectively in fluid communication with the process gas flow chamber 201 only when the valve element 202 is in the first and second axial positions. Like the embodiment of FIG. 2A, the plasma torch to which process gas flow is to be provided through the shuttle valve 200 includes an arc chamber located between an electrode and a tip surrounding the electrode. The first and second outlet conduits 204 and 205 of the shuttle valve 200 are each in fluid communication with the arc chamber of the plasma torch.

When the valve element 202 of the shuttle valve 200 in the first axial position, a process gas at a first flow rate and a first pressure is delivered to the plasma torch arc chamber through the first outlet conduit 204. When the valve element 202 of the shuttle valve 200 in the second axial position, a process gas at a second flow rate and a second pressure is delivered to the plasma torch arc chamber through the second outlet conduit 205. According to one implementation, each of the second flow rate and second pressure are respectively greater than the first flow rate and first pressure. The first and second process gas pressures may be provided through the use of a proportional valve or a pressure regulating system like those discussed above.

In the example of FIGS. 6A-C the shuttle valve 202 includes a first housing 210 and a second housing 220 that at least partially surrounds a portion of the first housing 210. The first housing 210 forms at least in part the process gas flow chamber 201 and the first outlet conduit 204, and the second housing forms at least in part the second outlet conduit 205 which is disposed between an external wall 211 of the first housing 210 and an internal wall 221 of the second housing 220. A part of the first housing 210 that forms the process gas flow chamber 201 includes one or more radially extending through holes 224 that communicate the process gas flow chamber 201 with the second outlet conduit 205 only when the valve element 202 is in the second axial position.

According to one implementation the valve element 202 of the shuttle valve 200 is similar in construction to that shown in FIGS. 3A-B. Therefore, like reference numbers will be used in its description.

The valve element 202 includes a proximal facing surface 75, a distal facing surface 77 and a peripheral sidewall 79 that extends axially between the proximal and distal facing surfaces 75 and 77. Located in the peripheral sidewall 79 are a plurality of recesses 71 through which the process gas flows out of the process gas flow chamber 201 and into the outlet conduit 204 when the valve element 202 is in the first axial position. Interposed between the recesses 71 are peripheral sidewall portions 73 that are arranged to block the one or more radially extending holes 224 when the valve element 202 is in the first axial position. When the valve element 202 transitions from the first axial position to the second axial position, the peripheral sidewall portions 73 move distally away from the one or more radially extending holes 224 to allow process gas to flow through them and into the second outlet conduit 205. According to some implementations the valve element 202 is continuously urged toward the first axial position by a spring 272.

According to one operational scheme, during a startup of the plasma torch, process gas at the second pressure (e.g. >100 psig or 120±15 psig) is first introduced into the process gas flow chamber 201 of the shuttle valve 200 to cause the valve element 202 to assume the second axial position for the purpose of delivering the process gas to the arc chamber of the plasma torch through the second outlet conduit 205 at the second flow rate. At a time thereafter when the arc chamber has been thoroughly purged of unwanted gases, the plasma torch is placed in operation with the process gas being delivered into the process gas flow chamber 201 of the shuttle valve 200 at the first pressure e.g. <100 psig or 80±15 psig). This results in the valve element 202 of the shuttle valve assuming its first axial position so that the process gas is delivered to the arc chamber through the first outlet conduit 204 at the first flow rate. According to one implementation, thereafter the process gas may be delivered into the process gas flow chamber 201 of the shuttle valve 200 again at the second pressure (or any other pressure sufficient to cause the valve element 202 to assume the second axial position) at a time when the plasma torch is in a shutdown mode. This again results in the process gas being delivered into the arc chamber at a higher flow rate than the first flow rate, which advantageously expedites a cooling of the plasma torch electrode and/or an expulsion of decaying gas located inside the arc chamber.

Figure 7:
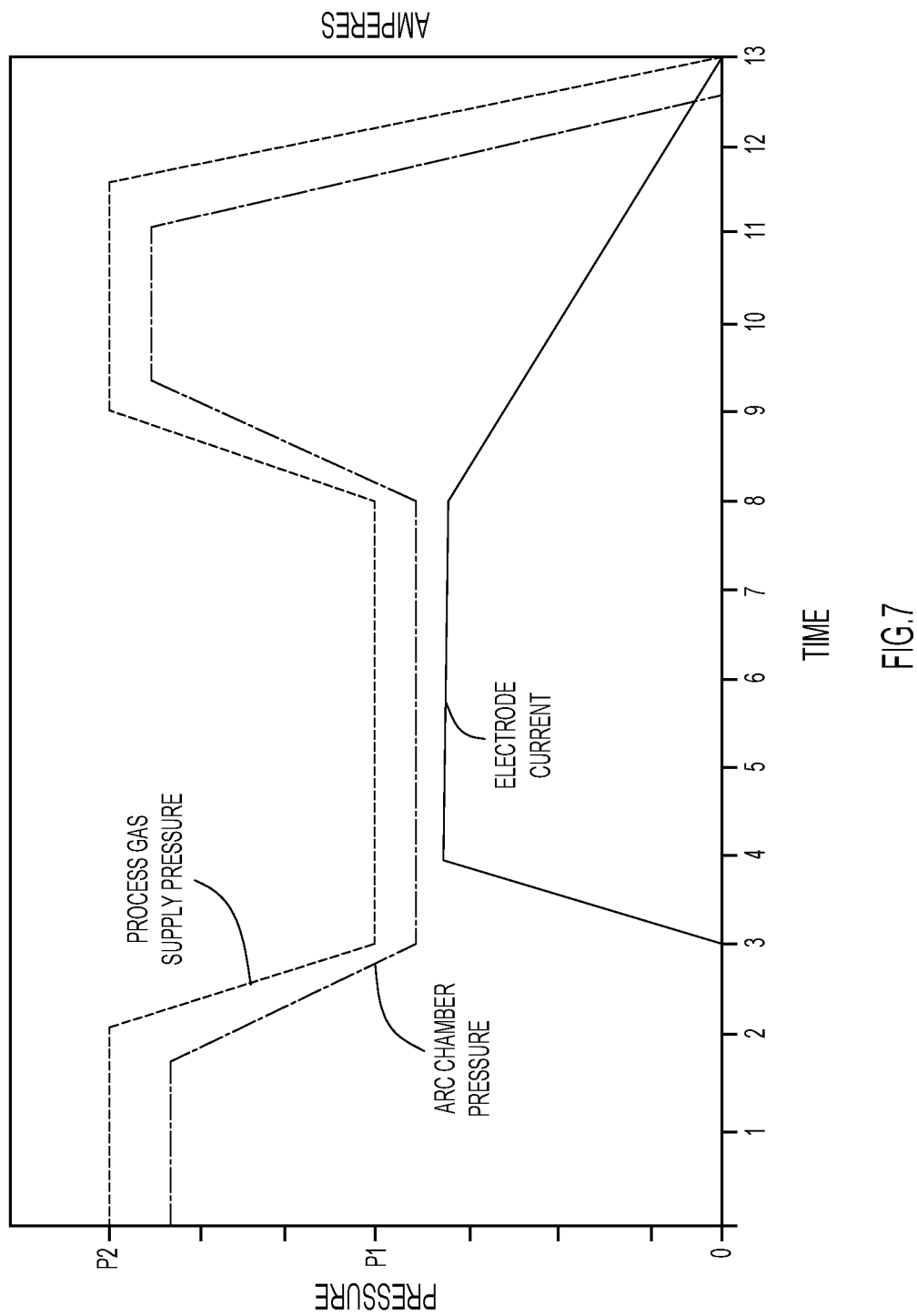
FIG. 7 is a graph showing the operational characteristics of a plasma torch in a startup mode, operating mode and shutdown mode.

FIG. 7 is a graphical representation of the process gas supply pressure, arc chamber pressure and electrode current of the plasma torch during a startup mode (time interval 0-3), operating mode (time interval 3-8) and a shutdown mode (time interval 8-13) of the plasma torch with use of the shuttle valve 200 of FIGS. 6A-C. In the time interval 0-2 the plasma torch is in the startup mode with the process gas being supplied to the shuttle valve at the second pressure P2 with no current being delivered to the plasma torch electrode. At time interval 2 the process gas supply pressure to the shuttle valve is ramped down to the first pressure P1 and current is delivered to the plasma torch electrode to place the plasma torch in operating mode. At the end of the operating mode at time interval 8 current flow to the plasma torch electrode is ramped down. Thereafter, as discussed above, a shutdown mode may be invoked that involves delivering the process gas to the shuttle valve again at the second pressure P2 (or any other pressure sufficient to cause the valve element 202 of the shuttle valve 200 to assume the second axial position) so that the flow rate of process gas passing through the arc chamber of the plasma torch is greater than the first flow rate. At a time thereafter, the supply of process gas to the shuttle valve is terminated to place the plasma torch in a shutdown state.

The following Group A-D clauses represent additional implementations.

Group A clauses:

Clause 1. A plasma torch comprising:
an electrode including a proximal end portion and a distal end portion;
a first process gas flow chamber in which at least a part of the proximal end portion of the of the electrode resides;
a second process gas flow chamber in which the distal end portion of the of the electrode resides;
a third process gas flow chamber that at least partially surrounds each of the first and second process gas flow chambers, the first and third process gas flow chambers being separated by at least one wall having one or more holes of a first size and one or more holes of a second size, the second size being greater than the first size;
a valve element located inside the first process gas flow chamber and transitional between a first axial position and a second axial position, when the valve element is in the first axial position the first process gas flow chamber is in fluid communication with the second process gas flow chamber and is also in fluid communication with the third process gas flow chamber via the one or more holes of the first size and not the one or more holes of the second size, when the valve element is in the second axial position the first process gas flow chamber is not in fluid communication with the second process gas flow chamber and is in fluid communication with the third process gas flow chamber via the one or more holes of the second size.

Clause 2. The plasma torch according to clause 1, wherein the second axial position is distal to the first axial position.

Clause 3. The plasma torch according to clause 1, wherein the valve element is continuously urged toward the first axial position.

Clause 4. The plasma torch according to clause 3, wherein the valve element is continuously urged toward the first axial position by a spring.

Clause 5. The plasma torch according to clause 1, wherein the first process gas flow chamber is configured to receive a process gas at a first pressure and at a second pressure, the second pressure being greater than the first pressure, the valve element configured to assume the first axial position when the process gas is delivered into the first chamber at the first pressure, the valve element configured to assume the second axial position when the process gas is delivered into the first chamber at the second pressure.

Clause 6. The plasma torch according to clause 1, wherein the second process gas flow chamber is located between an exterior surface of the distal end portion of the electrode and an interior surface of a tip that at least partially surrounds the distal end portion of the electrode.

Clause 7. The plasma torch according to clause 6, wherein the at least one wall having the one or more holes of the first size and the one or more holes of the second size is a part of the tip.

Clause 8. The plasma torch according to clause 6, wherein at least a portion of the third process gas flow chamber is located between an exterior surface of the tip and an interior surface of a shield cup that surrounds the tip.

Clause 9. The plasma torch according to clause 7, wherein at least a portion of the third process gas flow chamber is located between an exterior surface of the tip and an interior surface of a shield cup that surrounds the tip.

Clause 10. The plasma torch according to clause 1, wherein the valve element includes a proximal facing surface, a distal facing surface and a peripheral sidewall extending in an axial direction between the proximal and distal facing surfaces, when the valve element is in the first axial position the peripheral sidewall covers the one or more holes of the second size such that the first process gas flow chamber is in fluid communication with the third process gas flow chamber only through the one or more holes of the first size.

Clause 11. The plasma torch according to clause 1, wherein valve element includes a distal facing surface that faces an opening extending between the first and second process gas flow chambers, the distal facing surface being configured to close the opening only when the valve element is in the second axial position.

Clause 12. The plasma torch according to clause 10, wherein the distal facing surface of the valve element faces an opening extending between the first and second process gas flow chambers, the distal facing surface being configured to close the opening only when the valve element is in the second axial position.

Clause 13. The plasma torch according to clause 11, wherein the tip includes an inner peripheral shoulder adjacent the opening on which a portion of the distal facing of surface of the valve element rests when the valve element is in the second axial position.

Clause 14. The plasma torch according to clause 1, wherein the one or more holes of the first size are configured to permit a first flow rate of the process gas from the first chamber into the third chamber when the valve element is in the first axial position, and the one or more holes of the second size are configured to permit a second flow rate of the process gas from the first chamber into the third chamber when the valve element is in the second axial position, the second flow rate being greater than the first flow rate.

Clause 15. The plasma torch according to clause 5, wherein the first pressure is less than 100 psig and the second pressure is greater than 100 psig.

Clause 16. The plasma torch according to clause 1, wherein the proximal end portion of the electrode includes one or more indentations.

Clause 17. The plasma torch according to clause 16, wherein the one or more indentations form in an exterior surface of the electrode multiple spaced-apart radially protruding fins.

Clause 18. The plasma torch assembly according to clause 12, wherein the peripheral sidewall of the valve element includes a plurality of recesses that extend between and through the proximal and distal facing surfaces, a process gas flow being permitted through the plurality of peripheral recesses when the valve element is in the first axial position, the process gas flow not being permitted through the plurality of peripheral recesses when the valve element is in the second axial position.

Group B clauses:

Clause 1. A plasma torch assembly comprising;
a plasma torch including:
an electrode having an exterior surface;
a tip that at least partially surrounds the electrode, the tip having an interior surface and an exterior surface, there existing a first process gas flow chamber located between the exterior surface of the electrode and the interior surface of the tip;
a shuttle valve including:
a second process gas flow chamber located in a process gas flow path upstream the first process gas flow chamber, the second process gas flow chamber having an inlet, a first outlet and a second outlet, the second outlet located upstream the first outlet;
a valve element located inside the second process gas flow chamber and transitional between a first axial position and a second axial position, when the valve element is in the first axial position the second process gas flow chamber is in fluid communication with the first process gas flow chamber through the first outlet, when the valve element is in the second axial position the second process gas flow chamber is in fluid communication with the first process gas flow chamber through the second outlet.

Clause 2. The plasma torch assembly according to clause 1, wherein the first outlet, second outlet and inlet of the second process gas flow channel respectively have first, second and third central axes, the third central axis being parallel to the first central axis and orthogonal to the second central axis.

Clause 3. The plasma torch assembly according to clause 1, wherein the second process gas flow chamber is formed at least in part by one or more sidewalls, the second outlet including one or more through holes extending radially through the one or more sidewalls.

Clause 4. The plasma torch assembly according to clause 1, wherein the second axial position is distal to the first axial position.

Clause 5. The plasma torch assembly according to clause 1, wherein the valve element is continuously urged toward the first axial position.

Clause 6. The plasma torch assembly according to clause 5, wherein the valve element is continuously urged toward the first axial position by a spring.

Clause 7. The plasma torch assembly according to clause 1, wherein the second process gas flow chamber is configured to receive a process gas at a first pressure and at a second pressure from a process gas source, the second pressure being greater than the first pressure, the valve element configured to assume the first axial position when the process gas is delivered into the second chamber at the first pressure, the valve element configured to assume the second axial position when the process gas is delivered into the second chamber at the second pressure.

Clause 8. The plasma torch assembly according to clause 7, wherein the first pressure is less than 100 psig and the second pressure is greater than 100 psig.

Clause 9. The plasma torch assembly according to clause 1, wherein the valve element includes a proximal facing surface, a distal facing surface and a peripheral sidewall extending in an axial direction between the proximal and distal facing surfaces, when the valve element is in the first axial position the peripheral sidewall covers the second outlet, when the valve element is in the second axial position the peripheral sidewall does not cover the second outlet.

Clause 10. The plasma torch assembly according to clause 1, wherein the plasma torch includes a handle, the shuttle valve being located inside the handle.

Clause 11. The plasma torch assembly according to clause 1, further comprising a power supply through which electrical power and process gas flow is supplied to the plasma torch, the shuttle valve being located inside the power supply.

Clause 12. The plasma torch assembly according to clause 1, further comprising a power supply through which electrical power and process gas flow is supplied to the plasma torch through a cable hose that couples the power supply to the plasma torch, the shuttle valve being located inside the cable tube.

Clause 13. The plasma torch assembly according to clause 1, wherein the valve element includes proximal and distal facing surfaces that respectively face the inlet and first outlet of the second process gas flow chamber, the valve element including a plurality of peripheral recesses that extend between and through the proximal and distal facing surfaces, a process gas flow being permitted through the plurality of peripheral recesses when the valve element is in the first axial position, the process gas flow not being permitted through the plurality of peripheral recesses when the valve element is in the second axial position.

Clause 14. The plasma torch assembly according to clause 13, wherein when the valve element is in the first axial position the peripheral sidewall covers the second outlet to prevent process gas flow through the second outlet, and when the valve element is in the second axial position the peripheral sidewall does not cover the second outlet to permit process gas flow through the second outlet.

Group C clauses:

Clause 1. A method for operating a plasma torch that includes an electrode, a tip and shield cup, the electrode having a proximal end portion located inside a first process gas flow chamber and a distal end portion located inside a second process gas flow chamber, the second process gas flow chamber residing between an exterior surface of the electrode and an interior surface of the tip, the plasma torch further including a third process gas flow chamber that at least partially surrounds the first and second process gas flow chambers, the third process gas flow chamber being located between an exterior surface of the tip and an interior surface of the shield cup, the method comprising:

delivering a process gas at a first pressure to the first process gas flow chamber and delivering the process gas to the second and third process gas flow chambers respectively through first and second outlets of the first process gas flow chamber, the second outlet configured to deliver the process gas to the third process gas flow chamber at a first flow rate; and delivering the process gas at a second pressure to the first process gas flow chamber to cause a closing of the first outlet to terminate process gas flow to the second process gas flow chamber and to divert the process gas to the third process gas flow chamber through a third outlet, the third outlet configured to deliver the process gas to the third process gas flow chamber at a second flow greater than the first flow rate.

Clause 2. The method according to clause 1, wherein the process gas is delivered into the second process gas flow chamber in a first direction and into the third process gas flow chamber at a second direction different from the first direction.

Clause 3. The method according to clause 2, wherein the second direction is oblique or orthogonal to the first direction.

Clause 4. The method according to clause 1, further comprising initiating an arc in the second process gas flow chamber concurrently or after the process gas is delivered to the first process gas flow chamber at the first pressure.

Clause 5. The method according to clause 1, further comprising terminating the arc in the second process gas flow chamber concurrently with or after the process gas is delivered to the first process gas flow chamber at the second pressure.

Clause 6. The method according to clause 1, further comprising passing the process gas delivered into the first process gas flow chamber through channels formed in the exterior surface of the proximal end portion of the electrode.

Clause 7. The method according to clause 1, wherein the second outlet of the first process gas flow chamber includes a plurality of spaced-apart openings that extend through a wall that at least in part defines the first process gas flow chamber.

Group D clauses:

Clause 1. A method for operating a plasma torch assembly that includes a plasma torch and a shuttle valve, the plasma torch including an electrode and a tip, there residing between the electrode and tip a first process gas flow chamber, the shuttle valve including a second process gas flow chamber, the method comprising:

delivering a process gas at a first pressure to the second process gas flow chamber and delivering the process gas in the second process gas flow chamber to the first process gas flow chambers through a first outlet of the second process gas flow chamber at a first flow rate; and delivering the process gas at a second pressure to the first process gas flow chamber to cause a closing of the first outlet and an opening of a second outlet of the second process gas flow chamber, the second pressure being less than the first pressure, the second outlet configured to deliver the process gas to the first process gas flow chamber at a second flow rate less than the first flow rate.

Clause 2. The method according to clause 1, wherein the first and second outlets are arranged oblique or orthogonal to one another.

Clause 3. The method according to clause 1, further comprising initiating an arc in the first process gas flow chamber concurrently or after the process gas is delivered to the first process gas flow chamber at the second pressure.

Clause 4. The method according to clause 1, wherein the second outlet of the second process gas flow chamber includes a plurality of spaced-apart openings that extend through a wall that at least in part defines the second process gas flow chamber.

It is important to note that the previous examples are not suggested to limit other variations. The present disclosure is merely exemplary in nature and, thus, variations that do not depart from the spirit of the disclosure are intended to be within the scope of the present disclosure.

What is claimed is:

1. A plasma torch comprising:
a first process gas flow chamber in which at least a part of a proximal end portion of an electrode can reside;
a second process gas flow chamber in which a distal end portion of the electrode can reside;
a third process gas flow chamber that at least partially surrounds each of the first and second process gas flow chambers, the first and third process gas flow chambers being separated by at least one wall having one or more holes; and
a valve element disposed between a distal end of the first process gas flow chamber and a proximal end of the second process gas flow chamber and transitional between a first axial position and a second axial position, wherein when the valve element is in the first axial position, a process gas entering the first process gas flow chamber flows to the second process gas flow chamber and, when the valve element is in the second axial position, the valve element closes a path from the first process gas flow chamber to the second process gas flow chamber and the process gas entering the first process gas flow chamber flows to the third process gas flow chamber via the one or more holes.

2. The plasma torch according to claim 1, wherein the second axial position is distal to the first axial position.

3. The plasma torch according to claim 1, wherein the valve element is continuously urged toward the first axial position.

4. The plasma torch according to claim 1, wherein the first process gas flow chamber is configured to receive the process gas at a first pressure and at a second pressure, the second pressure being greater than the first pressure, the valve element configured to assume the first axial position when the process gas is delivered into the first process gas flow chamber at the first pressure, the valve element configured to assume the second axial position when the process gas is delivered into the first process gas flow chamber at the second pressure.

5. The plasma torch according to claim 1, wherein the second process gas flow chamber is located between an exterior surface of the distal end portion of the electrode and an interior surface of a tip that at least partially surrounds the distal end portion of the electrode so that the second process gas flow chamber forms at least a portion of a plasma arc chamber between the tip and the electrode.

6. The plasma torch according to claim 5, wherein the at least one wall having the one or more holes is a part of the tip.

7. The plasma torch according to claim 5, wherein at least a portion of the third process gas flow chamber is located between an exterior surface of the tip and an interior surface of a shield cup that surrounds the tip so that the third process gas flow chamber forms at least a portion of a shield gas flow path between the shield cup and the tip.

8. The plasma torch according to claim 1, wherein, when the valve element is in the first axial position, the valve element covers the one or more holes.

9. The plasma torch according to claim 1, wherein the valve element includes a distal facing surface that faces the second process gas flow chamber, the distal facing surface being configured to close the path from the first process gas flow chamber to the second process gas flow chamber when the valve element is in the second axial position.

10. The plasma torch according to claim 9, wherein a tip that at least partially surrounds the distal end portion of the electrode includes an inner peripheral shoulder adjacent an opening on which a portion of the distal facing surface of the valve element rests when the valve element is in the second axial position.

11. The plasma torch according to claim 1, wherein the one or more holes are holes of a second size, the at least one wall further comprises one or more holes of a first size that is smaller than the second size, and wherein:
   the one or more holes of the first size are configured to permit a first flow rate of the process gas from the first process gas flow chamber into the third process gas flow chamber when the valve element is in the first axial position; and
   the one or more holes of the second size are configured to permit a second flow rate of the process gas from the first process gas flow chamber into the third process gas flow chamber when the valve element is in the second axial position, the second flow rate being greater than the first flow rate.

12. The plasma torch according to claim 4, wherein the first pressure is less than 100 psig and the second pressure is greater than 100 psig.

13. The plasma torch according to claim 9, wherein the valve element includes a proximal facing surface and a peripheral sidewall extending in an axial direction between the proximal facing surface and the distal facing surface, the peripheral sidewall including a plurality of peripheral recesses that extend between and through the proximal facing surface and the distal facing surface, the process gas flowing from the first process gas flow chamber to the second process gas flow chamber via the plurality of peripheral recesses when the valve element is in the first axial position, the process gas not being permitted through the plurality of peripheral recesses when the valve element is in the second axial position.

* * * * *